(12) United States Patent
Shinohara et al.

(10) Patent No.: US 10,859,824 B2
(45) Date of Patent: Dec. 8, 2020

(54) DISPLAY DEVICE

(71) Applicant: OMRON Corporation, Kyoto (JP)

(72) Inventors: Masayuki Shinohara, Kyoto (JP); Mitsuru Okuda, Aichi (JP); Norikazu Kitamura, Osaka (JP); Yasuhiro Tanoue, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/220,548

(22) Filed: Dec. 14, 2018

(65) Prior Publication Data

US 2019/0121129 A1 Apr. 25, 2019

Related U.S. Application Data

(63) Continuation of application No. PCT/JP2017/022231, filed on Jun. 15, 2017.

(30) Foreign Application Priority Data

Jul. 21, 2016 (JP) .................. 2016-143403

(51) Int. Cl.
| | |
|---|---|
| *G02B 27/01* | (2006.01) |
| *G03B 35/18* | (2006.01) |
| *G09F 13/18* | (2006.01) |
| *F21S 2/00* | (2016.01) |
| *G09F 19/12* | (2006.01) |
| *G02B 30/00* | (2020.01) |
| *G02B 30/35* | (2020.01) |

(Continued)

(52) U.S. Cl.
CPC ............ *G02B 27/0101* (2013.01); *F21S 2/00* (2013.01); *G02B 6/006* (2013.01); *G02B 6/0088* (2013.01); *G02B 30/00* (2020.01);

*G02B 30/35* (2020.01); *G03B 35/18* (2013.01); *G09F 13/18* (2013.01); *G09F 19/12* (2013.01); *G02B 3/08* (2013.01); *G02B 6/0073* (2013.01); *G09F 2013/189* (2013.01)

(58) Field of Classification Search
CPC ..................... G02B 27/0101; G02B 27/017
USPC ......................................... 345/7, 8
See application file for complete search history.

(56) References Cited

U.S. PATENT DOCUMENTS

2001/0022562 A1  9/2001  Ishikawa
2004/0217920 A1  11/2004  Ishikawa
(Continued)

FOREIGN PATENT DOCUMENTS

CN  102455461 A  5/2012
CN  103207458 A  7/2013
(Continued)

OTHER PUBLICATIONS

International Search Report issued in Application No. PCT/JP2017/022231, dated Sep. 5, 2017 (1 page).

(Continued)

*Primary Examiner* — Calvin C Ma
(74) *Attorney, Agent, or Firm* — Osha Liang LLP

(57) ABSTRACT

A display device for head-up display forms an image with a view of an object from above in a vertical direction in a space outside the display device for an image which presents an object with a vertical direction. The object includes a reference surface that is a reference of the vertical direction. The display device forms the image so that an observer has a view from the upper part of the reference surface.

20 Claims, 31 Drawing Sheets

(51) Int. Cl.
*F21V 8/00* (2006.01)
*G02B 3/08* (2006.01)

(56) References Cited

U.S. PATENT DOCUMENTS

| | | |
|---|---|---|
| 2012/0098734 A1 | 4/2012 | Totani et al. |
| 2014/0145916 A1* | 5/2014 | Rossini ............... G02B 27/01 345/8 |
| 2014/0268327 A1 | 9/2014 | Dunn et al. |
| 2015/0049004 A1* | 2/2015 | Deering ............... G09G 3/02 345/8 |
| 2015/0130678 A1* | 5/2015 | Lee ...................... H01Q 1/526 343/841 |
| 2015/0193098 A1* | 7/2015 | Kauffmann ......... G06F 3/0304 715/771 |
| 2016/0011724 A1* | 1/2016 | Wheeler ............ G06F 3/04842 715/822 |
| 2016/0057411 A1 | 2/2016 | Shinohara |
| 2017/0192244 A1 | 7/2017 | Shinohara et al. |
| 2018/0017727 A1 | 1/2018 | Kitamura et al. |

FOREIGN PATENT DOCUMENTS

| | | |
|---|---|---|
| CN | 103927951 A | 7/2014 |
| JP | 2001-255493 A | 9/2001 |
| JP | 2011-215320 A | 10/2011 |
| JP | 5701434 B1 | 4/2015 |
| JP | 5861797 B1 | 2/2016 |
| JP | 2016-045422 A | 4/2016 |
| JP | 2016-045424 A | 4/2016 |
| TW | 201626052 A | 7/2016 |

OTHER PUBLICATIONS

Written Opinion issued in Application No. PCT/JP2017/022231, dated Sep. 5, 2017 (3 pages).

Office Action in counterpart Japanese Patent Application No. 2016-143403 dated Aug. 27, 2019 (4 pages).

Office Action issued in Chinese Application No. 201780035475.6, dated Aug. 4, 2020 (18 pages).

\* cited by examiner

Path 130
190

231

DISPLAY DEVICE

BACKGROUND

Field

The present invention relates to a display device.

Related Art

A display device that presents a two-dimensional image stereoscopically is known from, for example, Japanese Patent Publication No. 2001-255493. More specifically, the display device is made up of a display unit provided with an image display surface that shows a two-dimensional image, and a microlens array separated from the image display surface. The light emitted from the image display surface creates an image in an image forming plane located on the side of the display unit opposite the microlens array, and thus presents the two-dimensional image stereoscopically.

When producing a stereoscopic type image for a head-up display, an observer may perceive the unintended image depending on whether the observer purposefully looks up or purposefully looks down to see the image.

SUMMARY

A first embodiment provides a head-up display device. The display device forms an image with a view of an object from above in a vertical direction in a space outside the display device for an image which presents an object with a vertical direction.

The object may include a reference surface that is a reference of the vertical direction; and the display device may form the image so that an observer has a view from the upper part of the reference surface.

The display device may form the image with the object slanted to allow an observer a view from the upper part of the reference surface.

The display device may form the image with an edge of the object toward an observation position in the reference surface lower in the vertical direction than an edge of the object opposite the observation position in the reference surface whereby the object is slanted to allow an observer a view from the upper part of the reference surface.

The reference surface may be substantially parallel to the horizontal plane of the object.

The display device may include a light guide plate configured to guide light within a plane parallel to an emission surface. The display device may include a plurality of deflectors configured to deflect light guided thereto by the light guide plate, causing light forming the image in a space outside the light guide plate to exit from the emission surface. The plurality of deflectors may form the image with a view of the object from above in the vertical direction in a space outside the light guide plate.

Each deflector in the plurality of deflectors may cause the light to exit from the emission surface toward a direction substantially converging onto a single convergence point or convergence line in the space, or to substantially radiate from a single convergence point or convergence line in the space. The convergence point or the convergence line may be mutually different among the plurality of deflectors. Grouping a plurality of the convergence points or the convergence lines may form an image in a space.

Each deflector in the plurality of deflectors may be formed along a predetermined line within a plane parallel to the emission surface.

Each deflector in the plurality of deflectors may be configured to spread the light incident thereon into light with an intensity distribution corresponding to the image in a direction orthogonal to the light guide direction of the light guide plate in a plane parallel to the emission surface and cause the emission surface to output said light such that grouping the light from a plurality of the deflectors arranged along a direction orthogonal to the light guide direction thereby forms the light radiating from the image.

Each deflector in the plurality of deflectors may be configured to spread the light incident thereon two-dimensionally into light with an intensity distribution corresponding to the image and cause the emission surface to output said light such that grouping the light from three or more deflectors arranged on different straight lines thereby forms the light radiating from the image.

Each deflector in the plurality of deflectors may include one or a plurality of groups of deflection surfaces inclined relative to the emission surface on the outer surface or on the inside of the light guide plate and configured to reflect, refract, or diffract light guided thereto by the light guide plate.

At least one of the deflection surfaces may be configured to include a plurality of flat or curved surfaces oriented in different directions.

At least one of the deflection surfaces may be extended, bent, or curved in a direction orthogonal to the light guide direction of the light guide plate when the deflection surface is projected onto a surface parallel to the emission surface.

The display device may be used for providing route guidance. The object may present a route to guide an observer; The reference surface may present a path providing the route. The display device may form the image so that an observer has a view from the upper part of the path.

The image may include an image of an arrow presenting the direction along which an observer should travel on the path.

The object may represent an input component that an observer may manipulate. The reference surface may also be the input surface of the input component. The display device may form the image so that an observer has a view from the upper part of the input surface.

The display device may present a parallax image for stereo view or multiple views.

Note that the above summary does not list all the features of the present invention; and, sub-combinations of these sets of features also fall within the scope of the invention.

DETAILED DESCRIPTION

Embodiments of the present invention are described below with reference to the drawings. However, the present invention is not limited to the below embodiments. All combinations of the features described in the embodiments are not necessarily required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
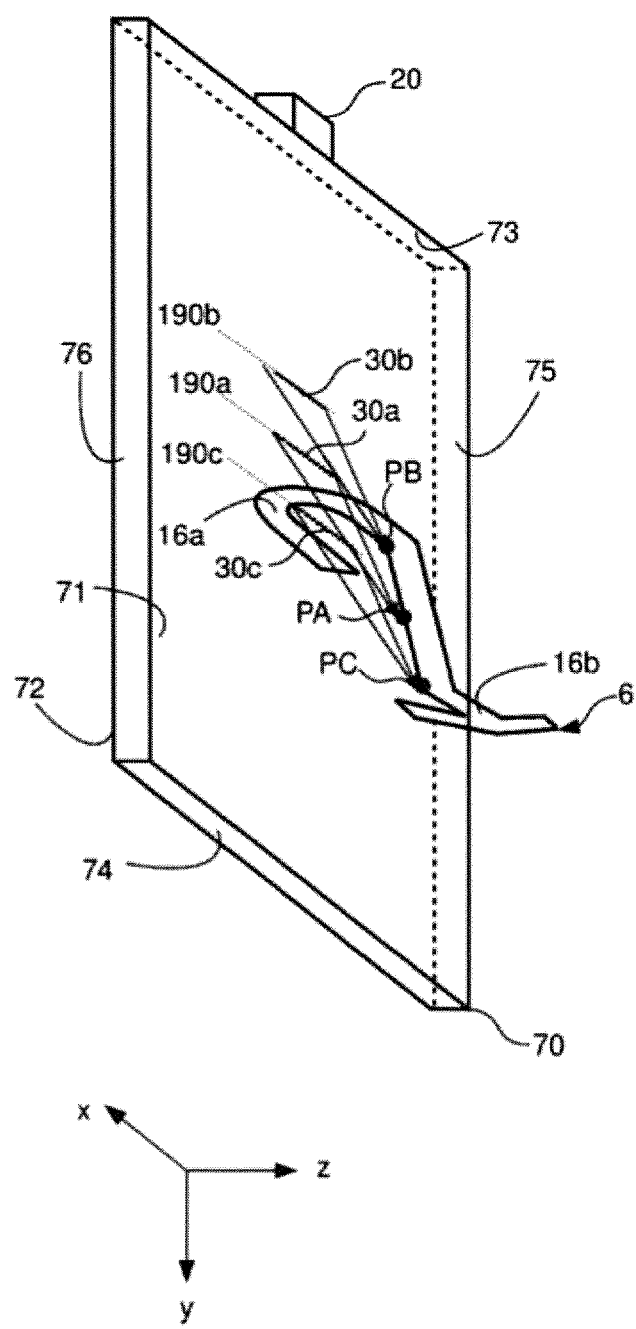
FIG. 1 is a schematic view of a display device 10 according to a first embodiment along with a three-dimensional image projected into a space.

FIG. 1 is a schematic view of a display device 10 according to a first embodiment along with a three-dimensional image projected onto a space. The drawings used for describing the embodiment are general and schematic in nature in order to provide a clear explanation. In some cases, the drawings are not to scale. The drawings that include a three-dimensional image are not necessarily drawn from the point of view of an observer and may be drawn from a different perspective to ensure the location of the image in a space is easy to understand.

The display device 10 may be used for providing route guidance. The display device 10 is a head-up display device. The display device 10 is for an observer located directly below the display device 10. For instance, the display device 10 may be provided hanging from the ceiling along a route. Therefore, an observer looks up at the display device 10.

The image 6 is an arrow showing the direction an observer should advance along path of the route. Here, the image 6 shows an object representing the route along which an observer is guided. The image 6 includes a reference surface image 16a and a reference surface image 16b. The reference surface image 16 shows a path providing the route. The reference surface image 16 shows a substantially horizontal path. The reference surface image 16 presents the outlines of a surface. As is later described, the lines in the reference surface image 16 showing the outline of the surface are produced to an extent, by a collection of points. The image 6 presented on the display device 10 directs an observer looking at the display device 10 to continue straight ahead in the current direction, make a U-turn toward the right to turn back, and then to travel downward, and straight ahead via stairs, or the like. Note that the object presenting the route is an example of an object with a vertical direction.

The display device 10 is provided with a light guide plate 70 and a light source 20. The light guide plate 70 is a transparent resin material with a relatively high index of refraction. The light guide plate 70 may be produced from, for instance, a polycarbonate resin (PC), a poly methyl methacrylate resin (PMMA), glass or the like. The light guide plate 70 is one example of the optical device. The display device 10 is an example of an optical system.

The light guide plate 70 includes an emission surface 71 that outputs light. The emission surface 71 acts as the display surface of the display device 10. The display device 10 uses light emitted from the emission surface 71 to produce a three-dimensional image 6. The image 6 is a three-dimensional image perceived by the user in a space. Note that, the term three-dimensional image refers to an image that appears to be at a location that is different from the emission surface 71 of light guide plate 70. The term three-dimensional image also includes a two-dimensional image perceived at a location away from the emission surface 71, for instance. In other words the term "three-dimensional image" does not refer only to an image perceived as having a solid shape, but also includes an image in two-dimensional form perceived at a different location than on the display surface of the display device 10.

The light guide plate 70 includes a rear surface 72 on the opposite side of the emission surface 71. The emission surface 71 is one principal surface of the light guide plate 70 and the rear surface 72 is the other principal surface. The light guide plate 70 also includes edges on the four sides thereof, i.e. a first edge 73, a second edge 74, a third edge 75, and a fourth edge 76. The first edge 73 is the incidence end surface of the light guide plate 70. A light source 20 is provided at the first edge 73, where light from the light source 20 enters the light guide plate 70 from the first edge 73. The second edge 74 is opposite the first edge 73. The fourth edge 76 is opposite the third edge 75.

A rectangular coordinate system, and in particular the right-handed system of x axis, y axis, and z axis is used at some points to describe the embodiments. Here the z axis direction is a direction perpendicular to the emission surface 71. The positive z axis direction is defined as the direction from the rear surface 72 to the emission surface 71. The y axis direction is a direction perpendicular to the first edge 73. The positive y axis direction is defined as the direction from the first edge 73 to the second edge 74. The x axis direction is the direction perpendicular to the third edge 75 and the fourth edge 76; and the positive x axis direction is defined as the direction from the third edge 75 to the fourth edge 76. To avoid redundancy in the description, planes parallel to the xy, yz, and xz planes are sometimes referred to as the xy plane, yz plane, and the xz plane, respectively.

The light source 20 may be an LED light source. The optical axis of the light source 20 is substantially parallel to the y axis. Light from the light source 20 enters via the first edge 73. Light from the light source 20 entering via the first stage 73 is totally reflected between the emission surface 71 on the rear surface 72, and travels through the light guide plate while spreading within a plane in the light guide plate 70. The center of the light guided by the light guide plate 70 is substantially parallel to the y axis. Thus, the light guide plate 70 guides light from the light source 20 such that the light spreads out in planar form in a plane parallel to the emission surface 71. A light beam guided through the light guide plate 70 passes through positions in the light guide plate 70 with a spread angle that is less than a predetermined value at each of the positions. More specifically, the light guided through the light guide plate 70 forms a spread angle that is less than a predetermined value about a direction connecting a position in the light guide plate 70 and the light source 20. That is, a light beam passing through a position in the light guide plate 70 forms a spread angle in the xy plane with the spread angle less than a predetermined value about a direction connecting the position in the light guide plate 70 and the light source 20. In this description the spread of a light beam passing through a point inside or outside the light guide plate is considered the spread of light when said light beam radiates from that point.

A plurality of deflectors 30 is provided on the rear surface 72 of the light guide plate 70; the plurality of deflectors 30 includes a deflector 30a, a deflector 30b, and a deflector 30c. The deflectors 30 are formed sequentially, for the most part, along the x axis direction. Light entering the first edge 73 from the light source 20 is totally reflected between the emission surface 71 and the rear surface 72 while guided by the light guide plate 70, and enters the deflectors 30 at each position of a deflector 30 along the x axis direction.

Here, the light guided by the light guide plate 70 is described as if there were no component spreading along the yz plane. The deflectors 30 cause the light entering at each position of a deflector 30, to substantially converge at a fixed point corresponding to the deflector 30. FIG. 1 specifically illustrates a portion of the deflectors 30: deflector 30a, deflector 30b, and deflector 30c. FIG. 1 shows the light rays emitted from the deflector 30a, deflector 30b, and deflector 30c converging.

More specifically, the deflector 30a corresponds to a fixed point PA in the image 6. The light rays from positions of the deflector 30a converge at the fixed point PA. Therefore, the optical wavefront from the deflector 30a appears as an optical wave front radiating from the fixed point PA. Similarly, the deflector 30b corresponds to the fixed point PB in the image 6, and light rays from positions of the deflector 30b converge at the fixed point PB. The deflector 30c further corresponds to the fixed point PC in the image 6, and light rays from positions of the deflector 30c converge at the fixed point PC. Thus, the deflectors 30 cause the light entering at each position of a deflector 30 to substantially converge at a fixed point corresponding to the deflector 30. Thus, any of the deflectors 30 may present an optical wavefront that appears as light radiating from a corresponding fixed point. The fixed points correspond to mutually different deflectors 30; and a grouping of a plurality of fixed points corresponding to the deflectors 30 produces an image 6 that may be perceived in a space.

Figure 2:
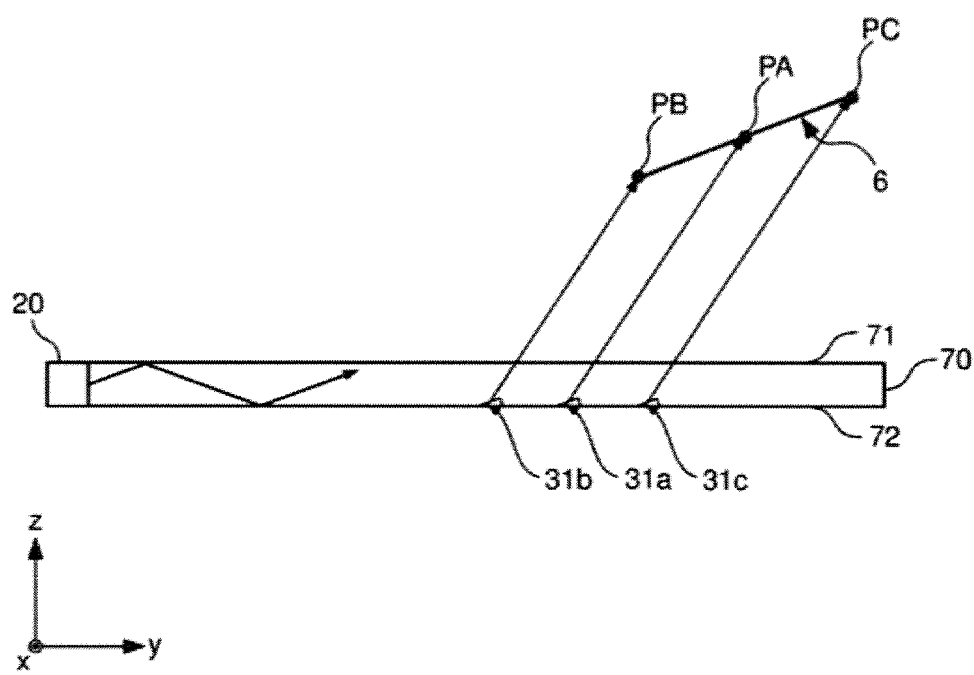
FIG. 2 illustrates a reflection surface 31a included in a deflector 30a; a reflection surface 31b included in deflector 30b; and a reflection surface 31c included in a deflector 30c.

In this embodiment, the deflectors 30 include multiple reflection surfaces formed sequentially, for the most part, along the x axis direction. A reflection surface is an example of a deflection surface. FIG. 2 illustrates one of the plurality of reflection surfaces included in the deflector 30a, i.e., a reflection surface 31a; one of the plurality of reflection surfaces included in the deflector 30b, i.e., a reflection surface 31b; and one of the plurality of reflection surfaces included in the deflector 30c, i.e., a reflection surface 31c. The light guided through the light guide plate 70 and incident on the reflection surface 31a reflects from the reflection surface 31a, passes through the emission surface 71, and travels toward PA. The light guided through the light guide plate 70 and incident on the reflection surface 31b reflects from the reflection surface 31b, passes through the emission surface 71, and travels toward PB. The light guided through the light guide plate 70 and incident on the reflection surface 31c reflects from the reflection surface 31c, passes through the emission surface 71, and travels toward PC.

The reflection surfaces of a single deflector 30 are oriented in mutually different directions and reflect light incident on the deflector 30 towards a single fixed point corresponding thereto. Thus, the light reflected from the reflection surfaces of the deflector 30 converges on a single fixed point corresponding to the deflector 30. For instance, the plurality of reflection light rays each from the plurality of reflection surfaces in the deflector 30a converge at the fixed point PA. The plurality of reflection light rays each from the plurality of reflection surfaces in the deflector 30b also converge at the fixed point PB. The plurality of reflection light rays each from the plurality of reflection surfaces in the deflector 30c further converge at the fixed point PC.

Thus, as above described, the light guided through the light guide plate 70 forms a spread angle in the xy plane that is less than a predetermined value about a direction connecting the position in the light guide plate 70 and the light source 20. In other words, the light guided through the light guide plate 70 spreads in the xy plane about a direction connecting the position in the light guide plate 70 and the light source 20. A deflector 30 may be provided at a position distant from the light source 20; in this case, the light guided through the light guide plate 70 travels with roughly the y axis direction as the center from the position of the deflector 30, and spreads substantially in the xy plane. Accordingly, light from the deflector 30a converges at substantially a single fixed point in, for example, a plane parallel to the xz plane which includes the fixed point PA.

As illustrated in FIG. 1, the deflector 30a is formed along a line 190a; the deflector 30b is formed along a line 190b; and the deflector 30c is formed along a line 190c. Here, the line 190a, the line 190b, and the line 190c are straight lines substantially parallel to the x axis. Any other deflector 30 is similarly formed sequentially for the most part along straight lines substantially parallel to the x-axis.

In this manner, the deflectors 30 are each formed along a predetermined line within a plane parallel to the emission surface 71. Light guided by the light guide plate 70 is incident on the deflectors 30, and the deflectors 30 may cause emission light to exit from the emission surface 71 toward a direction substantially converging onto a single convergence point in a space. Note that the fixed point for producing an image may be provided near the rear surface 72 of the light guide plate 70. In this case, a deflector 30 corresponding to the fix point near the rear surface 72 may cause light to exit from the emission surface 71 in a direction where the light radiates from the fixed point. For example, a deflector 30 corresponding to a fixed point near the rear surface 72 may include a reflection surface that causes emission light to exit from the emission surface 71 toward a direction that causes the light to radiate substantially from a single convergence point in a space.

Note that the light guided by the light guide plate 70 might not include a component that spreads in a direction coinciding with the yz plane; in this case, light from the deflector 30 converges substantially at a fixed point as above described. In contrast, when the light guided by the light guide plate 70 includes a component that spreads in a direction coinciding with the yz plane, the light reflected by the reflection surface of the deflector 30 substantially converges on a convergence line parallel to the yz plane and parallel to the emission surface. For instance, the light from a deflector 30a substantially converges on a line that includes [the fixed point] PA parallel to the yz plane and parallel to the emission surface 71. The reflection surface on the deflector 30 creates emission light that exits from the emission surface 71 in a direction so that the light radiates, for the most part, from a single convergence line in a space, similarly to when the fixed point is near the rear surface 72 of the light guide plate 70. However, the observer can see only the portion of the light converging on or radiating from the convergence line that is traveling toward an observer's eye; this therefore allows the observer to perceive the image 6.

Figure 3:
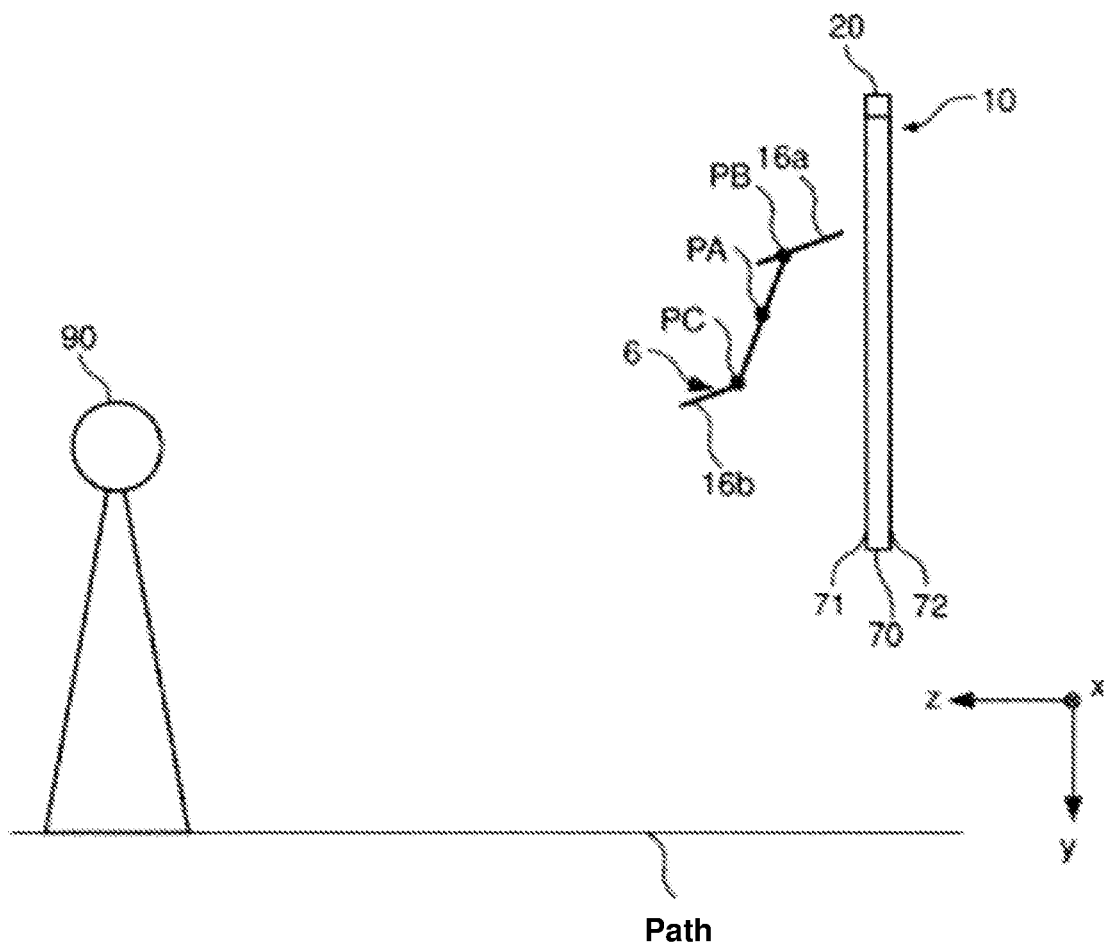
FIG. 3 illustrates an example of an environment where the display device 10 may be used.

FIG. 3 illustrates an example of an environment where the display device 10 may be used; the display device 10 is provided so that an observer 90 looks up to view the display.

The display device 10 produces an image 6 toward the observer relative to the light guide plate 70. The image 6 includes a reference surface image 16a and a reference surface image 16b. The reference surface image 16a and the reference surface image 16b represent reference surfaces on the route. The reference surface provides a reference of the vertical direction. In a display device 10 used to provide route guidance, the reference surface presents the path. The upper side of the reference surface is toward the observer 90. Consequently, the upper side of the reference surface becomes the surface that is directly above the observer.

Here, the reference surface image 16a and the reference surface image 16b are not produced level with the path, but are slanted vertically downward. For example, the display device 10 forms the reference surface image 16a and reference surface image 16b so that the reference surface image 16a and the reference surface image 16b slant vertically downward along the z axis. For instance, the deflectors 30 produce the reference surface image 16a and the reference surface image 16b in the image 6 so that the endpoint of the reference surface image 16 toward the observer 90 appears positioned directly below an endpoint in the reference surface image 16 that is toward the light guide plate 70. Consequently, the deflectors 30 can form an image that allows the observer 90 a view from the upper part of the path.

Thus, the deflectors 30 produce an image that allows the observer 90 a view from the upper part of the reference surface. Consequently, when an observer 90 views the display device 10 from directly below, the display device 10 can provide an image 6 representing the route to the observer 90, where the image appears as if the observer 90 were looking up at the same. In other words, the display device 10 can present the route represented by the image 6 as if the observer 90 were looking down on the image.

Figure 4:
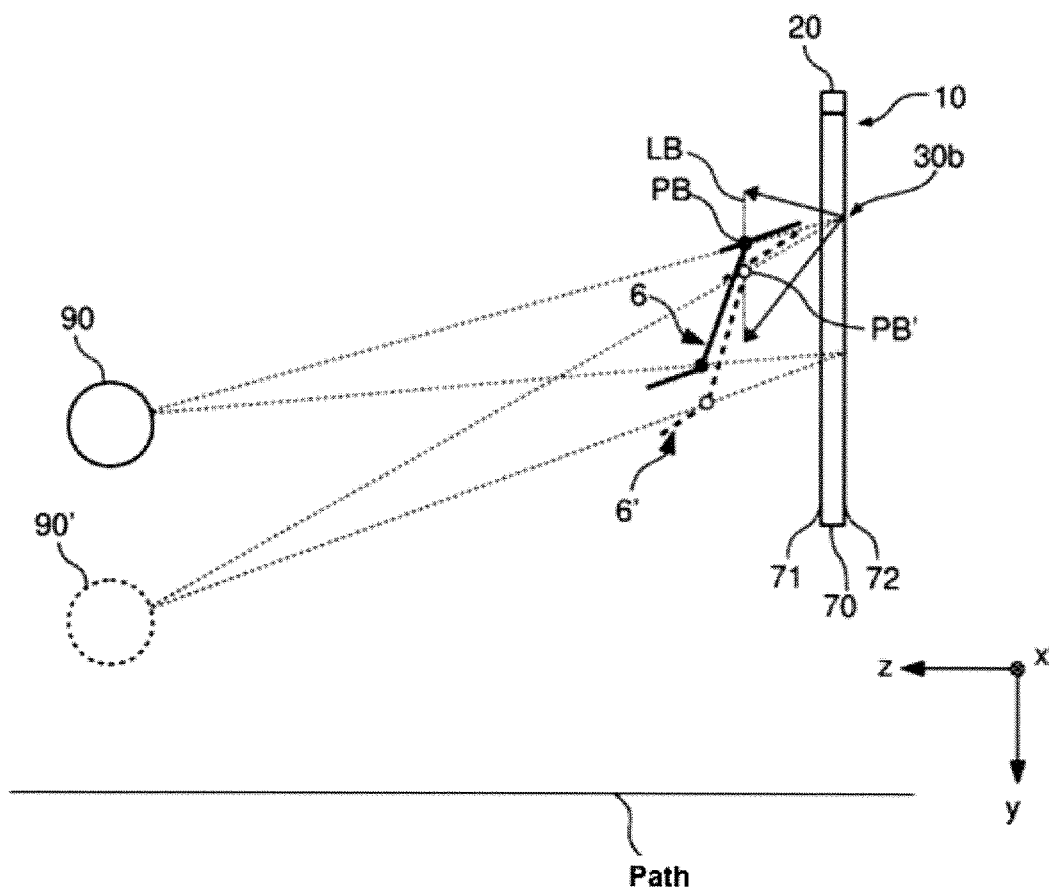
FIG. 4 is for describing an image perceived by an observer 90A positioned below.

FIG. 4 is a schematic illustrating an image 6' perceives by an observer 90A positioned below the observer 90. As above described, light from the deflectors 30 spread within a certain angular range in the yz plane when the light guided by the light guide plate 70 includes a component that spreads in the yz plane. Therefore, the light from the deflectors 30 substantially converge on a convergence line parallel to the yz plane and parallel to the emission surface. For example, as illustrated in FIG. 4, the light from the deflector 30b substantially converges on a convergence line LB which includes the fixed point PB.

The observer 90' represents an observer viewing the display device 10 from below the observer 90. The observer 90' can see only the portion of the light converging on the convergence line LB and traveling toward the observer's eye. Therefore, a point corresponding to, for example, the fixed point PB exists at PB', allowing the observer 90' to perceive the same. Consequently, the observer 90' can recognize that an image represented by the image 6' exists. Accordingly, the observer 90' can be presented with the route as if looking down on the route. Thus, the display device 10 can present an image that provides a bird's-eye view of the route even when the image is presented to an observer looking up from below the display device 10.

Figure 5:
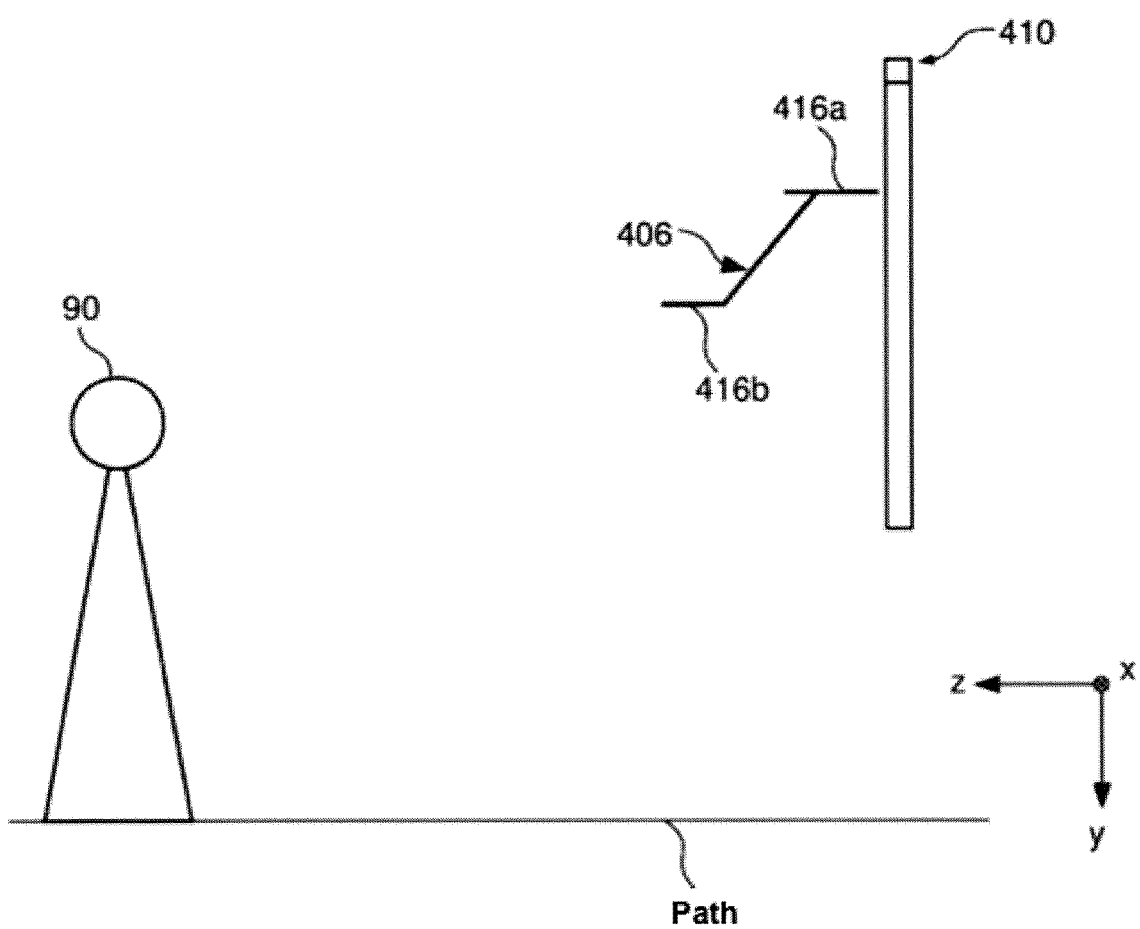
FIG. 5 depicts an environment where a display device 410 may be used as a comparative example for the display device 10.

FIG. 5 depicts an environment where a display device 410 is used as a comparative example for the display device 10; FIG. 5 corresponds to FIG. 3.

The display device 410 produces an image 406 toward the observer 90 relative to the light guide plate 70. The image 406 includes a horizontal surface image 416a and a horizontal surface image 416b that presents a horizontal surface. The horizontal surface image 416a and the horizontal surface image 416b creates a level path. For example, the display device 410 produces the horizontal surface image 416a and the horizontal surface image 416b such that the horizontal surface image 416a and the horizontal surface image 416b are substantially parallel to the z axis direction. Here, an observer 90 sees the image 406 formed by the display device 410 as the route as if the observer 90 were looking from directly below.

Figure 6A:
FIGS. 6A, 6B, and 6C are schematic views of a horizontal surface 416 viewable by an observer 90
Figure 6B:
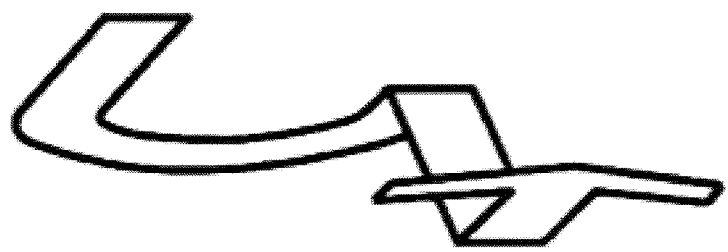
Figure 6C:
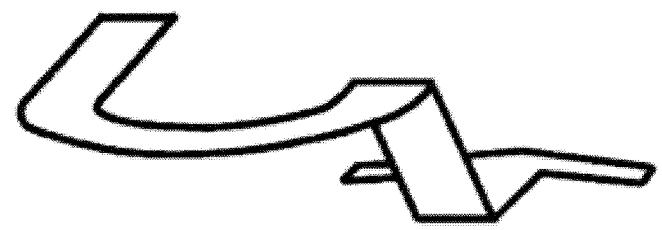

FIG. 6A is a schematic view of the image 406 viewable by an observer 90. The observer sees the image 406 as the route depicted in FIG. 6B when the observer 90 consciously views the image as if looking from directly below. In contrast, the observer sees the image 406 as the route depicted in FIG. 6C when the observer 90 consciously views the image as if viewing the image from directly above. Therefore, if the head-up display device 10 produces an image like the image 406 which is the view when looking up, the image tends to confuse the observer.

With that in mind, as described with reference to FIG. 1 through FIG. 4, the display device 10 produces an image 6 with a reference surface image 16 so that an observer 90 views the image as if looking from directly above. Thus, as illustrated in FIG. 1, an image can be presented to the observer 90 and appear as if the observer were looking up at the image. Accordingly, the display device 10 presents an image 6 that tends to be clear to the observer 90 compared to the image presented by the display device 410 (FIG. 5 and FIGS. 6A, 6B, and 6C).

As described with reference to FIG. 1 through FIG. 4, the deflectors 30 in the display device 10 can form an image that allows the observer 90 a view from the upper part of the path. Hereby, the deflectors 30 produce an image with a view of the object from above in the vertical direction in a space outside the light guide plate 70. Therefore, an observer 90 can easily perceive the image as a bird's-eye view, reducing the likelihood that the observer sees an unintended view.

Figure 7:
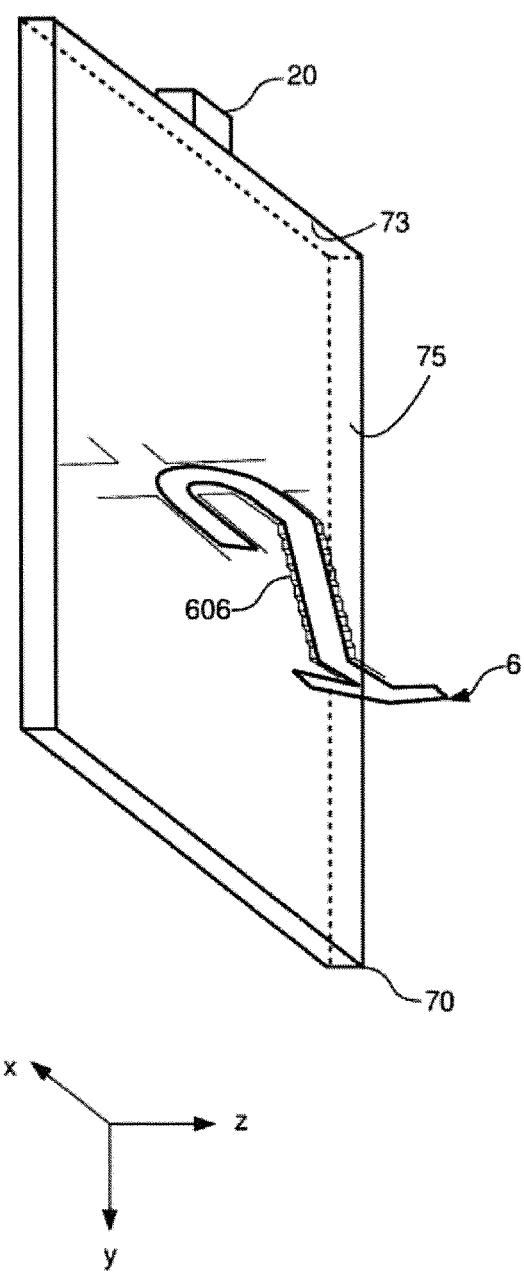
FIG. 7 is a schematic view of a display device 610 as a comparative example for the display device 10 along with a three-dimensional image projected into a space.

FIG. 7 is a schematic view of a display device 610 as a comparative example for the display device 10 along with a three-dimensional image projected into a space; the display device 610 produces an image 6 and an image 606. The image 606 presents the path on a map. For example, the display device 610 may be provided in a train station for route guidance on the premises. Here, the image 606 may also present a map of the premises. The path may be presented clearly to the observer.

Figure 8A:
FIGS. 8A and 8B are schematic views of a deflector 130 and a deflector 132 as comparative examples of the deflector 30.
Figure 8B:
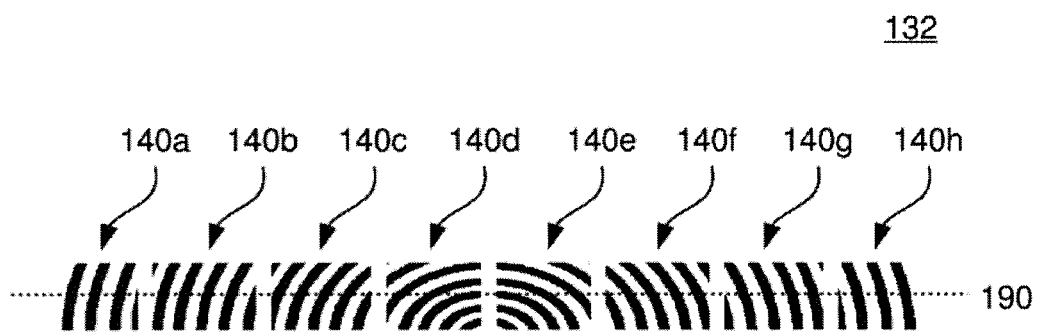

FIGS. 8A and 8B are schematic views of a deflector 130 and a deflector 132 as comparative examples of the deflector 30. FIG. 8A outlines a single deflector 130, formed from a portion of a Fresnel lens. The plurality of refraction surfaces (prism surfaces) in the deflector 130 may include gaps therebetween, where the plurality of refraction surfaces and the gaps function as a Fresnel lens.

The deflectors 132 illustrated in FIG. 8B corresponds to a deflector 130 partitioned into a plurality of segments along the x axis direction, i.e., a segment 140a, segment 140b, segment 140c, segment 140d, segment 140e, segment 140f, segment 140g, and segment 140h. Light from each of the segments in the deflector 132 converge on or radiate from the same fixed point. Thus, partitioning the deflector into a plurality of segments may increase the contrast of the image. Note that in addition to a reflection surface or a Fresnel lens, a diffraction grating may also be used as a deflector 30.

Figure 9:
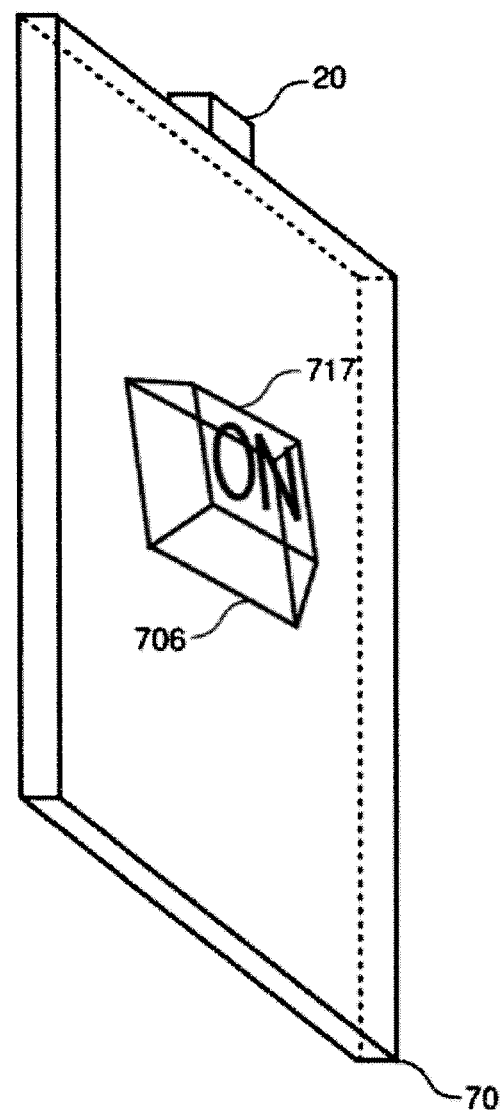
FIG. 9 is a schematic view of an image 706 formed by a display device 710 as a comparative example.

FIG. 9 is a schematic view of an image 706 formed by a display device 710 as a comparative example of the display device 10. The image 706 represents a button; the image 706 includes a reference surface image 717 representing the input surface of the button. The reference surface image 717 represents the reference surface that is the basis for the vertical direction of the button. The deflectors 30 produce an image 706 that renders the input surface visible to the observer. More specifically, the deflectors 30 form an image 706 of a slanted object where the edge of the input surface toward an observation position is lower than an edge opposite the observation position on the input surface. Thus, an observer can easily recognize the input surface on the head-up display device 10.

A sensor for detecting the proximity of an object to the reference surface image 717 may be used with the display device 710 to provide an operational input device that serves as a virtual switch. This operational input device may be used as a switch for controlling the functions provided overhead such as on an air conditioner. The operational input device may also be used on a control board in a factory, for instance.

The button presented by the image 706 is an example of an input component an observer may manipulate. The input component may be implemented in various ways besides a button. The reference surface may also be the input surface of the input component.

The input surface described with reference to FIG. 9, and the path presented with a route described with reference to the display device 10 are examples of reference surfaces. The reference surface is not limited to a surface. The reference surface may serve as a reference of the vertical direction for an object having a vertical direction. For example, the reference surface may be the surface orthogonal to the vertical direction of the object. For example, the reference surface may also be the surface parallel to the vertical direction of the object. The reference surface may be parallel to a horizontal plane or may be non-parallel to the horizontal plane.

As described with reference to FIG. 1 through FIG. 9, the deflectors 30 produce a slanted image of an object having a vertical direction so that an observer 90 has a view from the upper part of the reference surface that provides a reference of the vertical direction of the object. More specifically, the deflectors 30 produce a slanted image of an object so that an edge toward an observation position in the reference surface is lower in the vertical direction than an edge opposite the observation position in the reference surface so that the observer 90 has a view from the upper part of the reference surface.

The display device 10 is not limited a display device for providing route guidance or a display device for a switch. The display device 10 may be adopted in any way as a head-up display device. For example, the display device 10 may be adopted as an advertisement display device provided above a passageway. The display device 10 may also be adopted as a billboard provided on top of a building, or a display device presenting, for instance the logo on a machine provided above a room.

Figure 10:
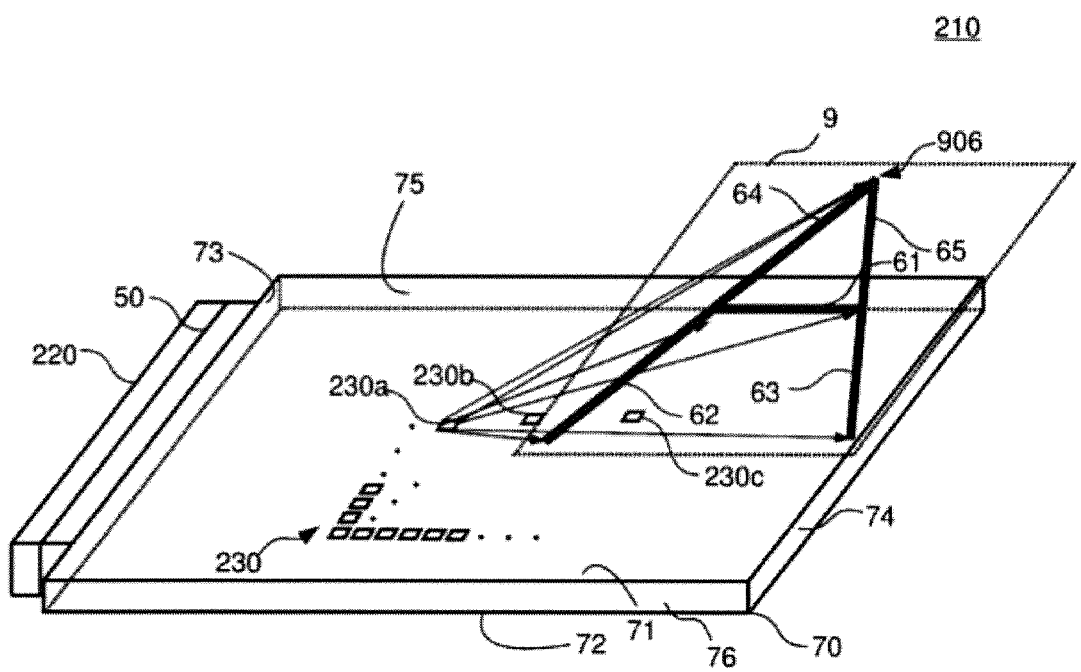
FIG. 10 is a schematic view of a display device 210 according to a second embodiment along with an image projected onto a space.

FIG. 10 is a schematic view of a display device 210 according to a second embodiment along with an image projected onto a space. The components in the display device 210 with reference numerals identical to components in the display device 10 have an identical configuration. In describing the second embodiment, descriptions of the configurations identical to those in the display device 10 are omitted, with differences primarily described.

In the second embodiment, the display device 210 produces an image 906 of the character "A" in a plane 9 located on the positive side of the z axis from the emission surface 71. The plane 9 is parallel to the xy plane. The description of the second embodiment presents a case where the display device 210 produces an image of the character "A" in order to describe clearly how the display device produces a three-dimensional image. However, a later-described display device, configured similarly to the display device 210 can present an image that can be perceived in substantially the same way as the image 6 described with reference to FIG. 1 through FIG. 4, and the like.

The display device 210 is provided with a light guide plate 70, a light source 220, and a light-incidence tuning portion 50. The light source 220 may include a light emitting diode (LED). Light from the light source 220 is adjusted by the light-incidence tuning portion 50 and enters the light guide plate 70 via the first edge 73 as incidence light.

A plurality of deflectors 230 is provided on the rear surface 72 of the light guide plate 70; the plurality of deflectors 230 includes a deflector 230a, a deflector 230b, and a deflector 230c. The deflectors 230 may be provided two-dimensionally within the xy plane. The deflectors 230 may be provided in a matrix in the xy plane. Light guided by the light guide plate 70 enters the deflectors 230.

The deflector 230a, the deflector 230b, and the deflector 230c each deflect light propagating through the light guide plate 70 and each causes the light exiting from the emission surface 71 to draw the image 906. More specifically, the deflector 230a causes the emission surface 71 to emit light bound for various locations in the image 906. The deflector 230a deflects the light guided thereto by the light guide plate 70 such that the light spreads out in the xy plane and the yz plane and travels toward various locations in the image 6. FIG. 10 illustrates a state where light from the deflector 230a spreads out toward a number of locations in the image 906. The deflector 230b and the deflector 230c along with the other deflectors 230 each behave identically. The deflectors 230 fill a microscopic area on the rear surface 72. Each of the deflectors 230 fill a smaller surface area than when projected on the image 906 in the xy plane. The image 906 is created from light spreading out from each deflector 230 among the multitude of deflectors 230 toward various locations in the image 906. That is, the light from a multitude of deflectors 230 produces the light that radiates from the direction of the image 906. The light that creates the image 906 may be provided by at least three deflectors 230 that are not along the same straight line. That is, each of the deflectors 230 converts light entering therein into light with an intensity distribution according to the image 906 that spreads out two-dimensionally and exits from the emission surface. Thus, the light from the three or more deflectors 230 that are not on the same straight line forms the image 906. The display device 210 is thereby able to project a three-dimensional image into a space. The display device 210 groups the light beams from the plurality of deflectors 230 that are not on the same straight line to provide an observer with light beams that radiate from the image 906. An observer is therefore able to perceive the image 906 regardless of whether the image is viewed from the x axis direction or the y axis direction.

Figure 11:
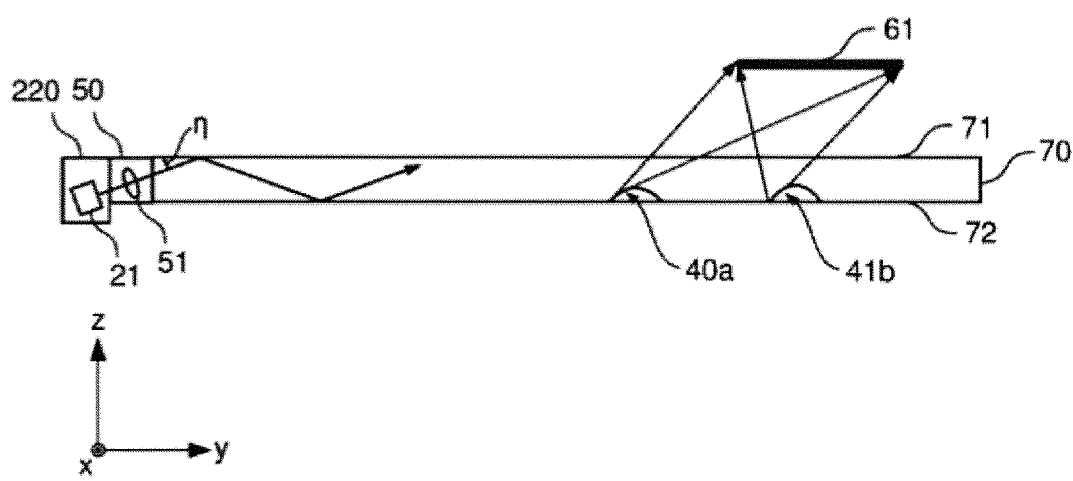
FIG. 11 schematically illustrates a cross section of the display device 210 in the yz plane.
Figure 12:
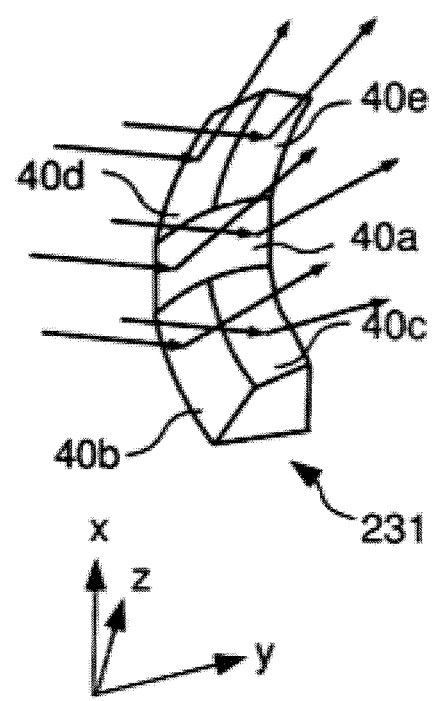
FIG. 12 is a schematic view illustrating an example of an optical element 231 that includes a deflector 230.

FIG. 11 schematically illustrates a cross section of the display device 210 in the yz plane; and FIG. 12 is a schematic view illustrating an example of an optical element 231 that includes a deflector 230.

The light source 220 may include an LED 21. A plurality of the LEDs 21 is arranged along the x axis direction. The optical axis of the light emitted from the LEDs 21 form an angle η with the emission surface 71. The narrow angle η between the optical axis of the light emitted from the LEDs 21 and the emission surface 71 is less than 20°. The light emitted from the LEDs 21 enters the light-incidence tuning portion 50.

The light-incidence tuning portion 50 includes lenses 51. The lenses 51 arranged along the x axis direction are respectively paired to an LED 21 in the plurality of LEDs 21. Each of the lenses 51 reduces the spread of light traveling along the optical axis for the light emitted from the LED 21 corresponding thereto. The lenses 51 render light emitted from the LEDs 21 as nearly parallel light. For instance, the lenses 51 may reduce the spread angle of the light emitted from the LEDs 21 in the xy plane. The lenses 51 may also reduce the spread angle of the light emitted from the LEDs 21 in the yz plane. Hereby, light may enter the light guide plate 70 as nearly parallel light.

Hereby the light beams within the xy plane guided by the light guide plate 70 and passing through locations in the light guide plate 70 spread out at an angle of a predetermined value and advance from the locations in the light guide plate 70 about a direction connecting the locations in the light guide plate 70 and the light source 220. In this disclosure, the light that spreads from a certain point when light beams pass through the certain point inside or outside the light guide plate and advances is considered to have been output from that point, and is simply referred to as "the spread of light" or the like. The angle of this spread of light is referred to simply as the "spread angle". In a light intensity distribution along an angular direction, the spread angle may be the position at which the light intensity is half the maximum (full width at half maximum). The spread angle of light guided by the light guide plate 70 may be less than or equal to 5°. The spread angle of light may ideally be less than 1°. When projected onto the xy plane, the spread angle of the light may be less than or equal to 5° and ideally may be less than 1°. When projected onto the yz plane, the spread angle of the light may be less than or equal to 5° and ideally may be less than 1°.

As illustrated in FIG. 11 and FIG. 12, the deflector 230a includes a reflection surface 40a. The reflector 230a also includes reflection surface 40b, reflection surface 40c, reflection surface 40d, and reflection surface 40e. The reflection surface 40 is an example of an optical surface functioning as a deflection surface that deflects light. The reflection surface 40a, reflection surface 40b, reflection surface 40c, reflection surface 40d, and reflection surface 40e are curved surfaces oriented in different directions. As above described, the optical axis of the LEDs 21 are inclined at an angle η in the yz plane relative to the emission surface 71. Therefore, even when the light entering the light guide plate 70 approaches parallel light, a greater amount of light is repeatedly reflected by and propagated between the emission surface 71 and the rear surface 72 in the light guide plate 70 compared to when the optical axis of incident light that is parallel to the y axis. Consequently, a greater amount of light strikes the reflection surface 40 compared to when the optical axis of incident light is parallel to the y axis.

The reflection surface 40a causes light incident thereon to be emitted from the emission surface 71 at a different emission angle according to where the light is incident on the reflection surface 40a. The reflection surface 40a causes light incident thereon to spread within an area 61 in the image 906. In this embodiment the area 61 is an area parallel to the y axis. The light reflecting from the reflection surface 40a is oriented from the reflection surface 40a toward where the area 61 exists, and essentially no light reflected from the reflection surface 40a travels toward where the area 61 does not exist. Accordingly, the light reflected from the reflection surface 40a is substantially distributed only at angles within the yz plane from the reflection surface 40a toward the area 61. Thus, the reflection surface 40a modulates the intensity of incident light in the yz plane in an angular direction and outputs said light. The reflection surface 40a is a curved surface; therefore, the reflection surface 40a is still capable of producing light that forms lines that create the image even when the light incident thereon is parallel light.

The reflection surface 40b reflects the light incident thereon spreading the light within an area 62 in the image 906. The area 62 forms a portion of the character 'A' between an intersection point with the area 61 on the negative y axis and the furthest end point along the positive x axis. The reflection surface 40c reflects the light incident thereon spreading the light within an area 63 in the image 906. The area 63 forms a portion of the character 'A' between an intersection point with the area 61 on the positive y axis and the furthest end point along the positive x axis. The reflection surface 40d reflects the light incident thereon spreading the light within an area 64 in the image 906. The area 64 forms a portion of the character 'A' between an intersection point with the area 61 on the negative y axis and the furthest end point along the negative x axis. The reflection surface 40e reflects the light incident thereon spreading the light within an area 65 in the image 906. The area 65 forms a portion of the character 'A' between an intersection point with the area 61 on the positive y axis and the furthest end point along the negative x axis. Because the reflection surface 40b, the reflection surface 40c, the reflection surface 40d, and the reflection surface 40e are all curved, each of the reflection surfaces 40 is capable of producing light that forms lines that create the image even when the light incident thereon is parallel light.

Thus, the reflection surface 40a spreads light incident thereon having an intensity distribution according to at least the image of the area 61 along the z axis, and causes emission of said light. The reflection surface 40b spreads light incident thereon having an intensity distribution according to at least the image of the area 62 along the x axis, and causes emission of said light. The reflection surface 40c spreads light incident thereon having an intensity distribution according to at least the image of the area 63 along the x axis, and causes emission of said light. The reflection surface 40d spreads light incident thereon having an intensity distribution according to at least the image of the area 64 along the x axis, and causes emission of said light. The reflection surface 40e spreads light incident thereon having an intensity distribution according to at least the image of the area 64 along the x axis, and causes emission of said light. Thus, the deflector 230a possesses a plurality of reflection surfaces that reflect light towards lines in the image 906 where the deflector 230a modulates the intensity of incident light two dimensionally or in two directions according to the image 906, and causes emission of said light from the emission surface 71. Hereby, a single deflector 230a provides light beams that pass through substantially all the image 906.

The deflector 230b includes a reflection surface 41b. Similar to the reflection surface 40a, the reflection surface 41b causes light incident thereon to be emitted from the emission surface 71 at a different emission angle according to where the light is incident on the reflection surface 41b. More specifically, the light reflecting from the reflection surface 41b spreads within an area 61 in the image 906. FIG. 12 only illustrates the reflection surface 40a and the reflection surface 41b; however, each of the deflectors 230 include a reflection surface that spreads the incident light within the area 61. Each of the deflectors 230 includes a plurality of reflection surfaces that reflect light toward lines within the image 906 similarly to the deflector 230a. Each of the deflectors 230 modulates the intensity of the light incident thereon two-dimensionally or in two directions according to the image 906, and causes emission of said light from the emission surface 71. Thus, each of the deflectors 230 provides light beams that pass through substantially all the image 906.

The light emitted from the emission surface 71 is actually refracted within the emission surface 71. Therefore, the deflectors 230 are designed to take into account the refraction within the emission surface 71. However, for the sake of simplicity, this embodiment is described as if there were no refraction in the emission surface 71.

Figure 13:
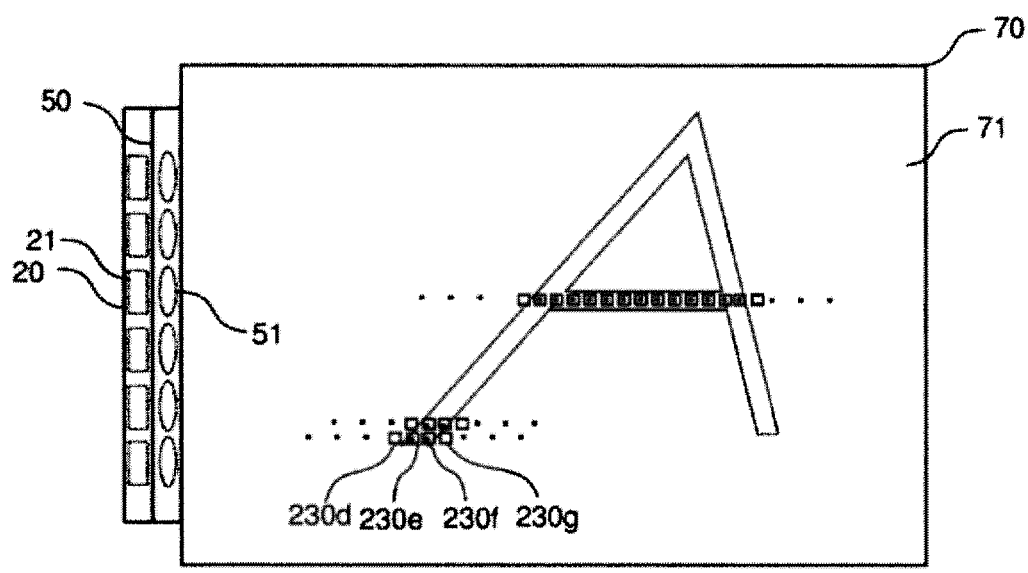
FIG. 13 schematically illustrates a deflector 230 providing light that travels toward a specific observation position.
Figure 13:
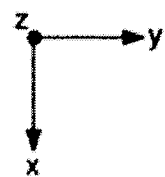

FIG. 13 schematically illustrates a deflector 230 providing light that travels toward a specific observation position. For instance, the light that produces the area 62 is provided from a specific reflection surface in the deflector 230e, and a specific reflection surface in the deflector 230f, while no light is provided from the deflector 230d and the deflector 230g. Thus, a specific portion in the image 906 is created by specific portions of a specific deflector 230 of the plurality of deflectors 230 when the image is viewed from a specific observation position.

The display device 10 is configured such that each of the deflectors 230 provided two-dimensionally in the xy plane provide light that passes though all sites in the image 906. Therefore, the three-dimensional image may be viewed over a wide range. Because the display device is also capable of presenting light from a specific location in the xy plane that passes through sites throughout the image 906, the three-dimensional image is formed as a plane and not a point.

Figure 14:
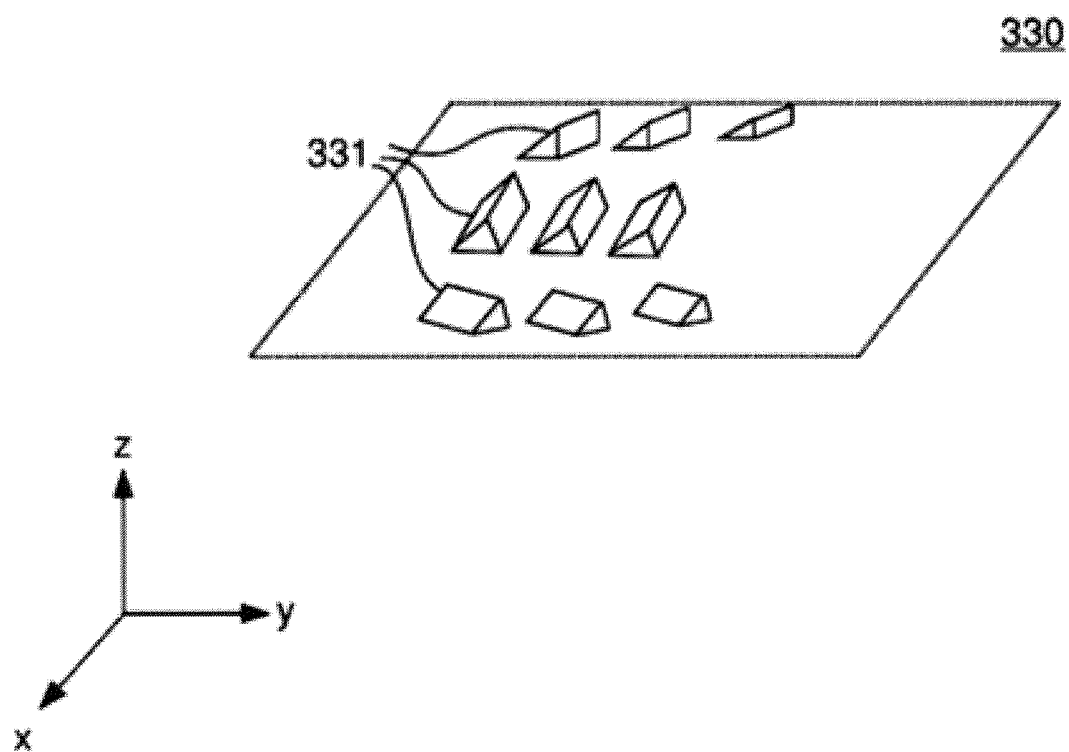
FIG. 14 is a schematic view of a deflector 330 as a comparative example of the deflector 230.

FIG. 14 is a schematic view of a deflector 330 as a comparative example of the deflector 230. The deflector 330 includes a plurality of optical elements 331 provided at separate locations. The optical elements 331 each possess a single flat reflection surface. The reflection surfaces in the optical elements 331 each reflect light incident thereon toward mutually different points in the image 906.

The optical elements 331 may all be provided separately, or may be provided where a portion thereof are connected. The distribution pattern for the optical elements 331 may be different in accordance with the location at which deflectors 330 are provided.

Figure 15:
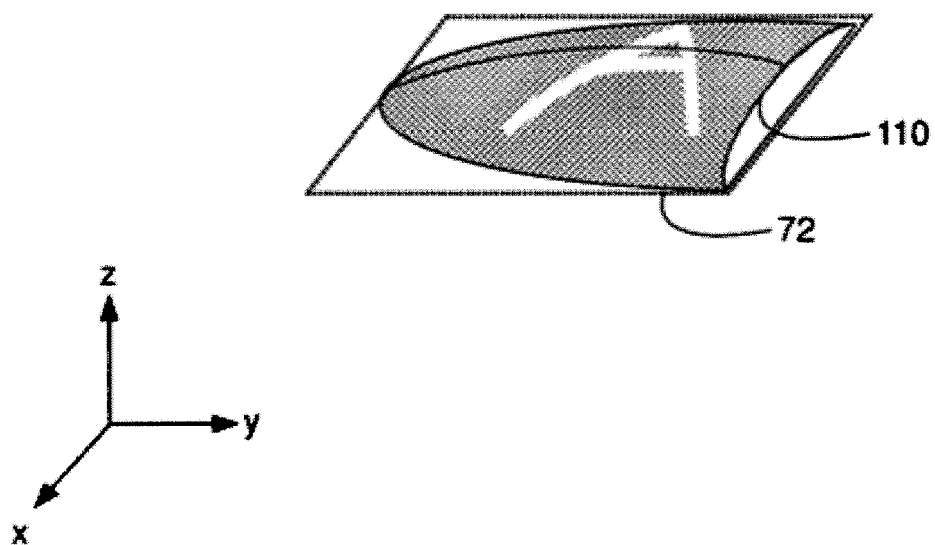
FIG. 15 is a schematic perspective view of a deflector 230A as a comparative example of the deflector 230.

FIG. 15 is a schematic perspective view of a deflector 230A as a comparative example of the deflector 230; the deflector 230A possesses an entirely convex reflection surface. The optical deflector 230A is provided on the rear surface 72 of the light guide plate 70. The convex reflection surface of the optical deflector 230A deflects the light guided through the light guide plate 70 so that the light beams passing through the plane 9 which includes the image 906 exit from the emission surface 71.

The portions of the deflector 230A that do not correspond to creating the character 'A' are provided with an anti-reflective film 110. The light entering at portions where the anti-reflective film 110 is formed on the deflector 230A does not substantially reflect therefrom. Only the light entering at portions with no anti-reflective film 110 on the deflector 230A reflect therefrom. Thus, the optical deflector 230A deflects light entering therein so that the light beams passing through the character 'A' of the image 906 exit from the emission surface 71. The anti-reflective film 110 may be produced, for instance, by coating areas of the rear surface 72 that do not correspond to the area forming the character 'A' with black paint material. The anti-reflective film 110 may be produced by printing areas that do not correspond to the area forming the character 'A' with black paint material. Because the deflectors 230A may be created by printing the black paint material after forming the convex portion on the light guide plate 70, this simplifies the process of producing the deflectors.

Figure 16:
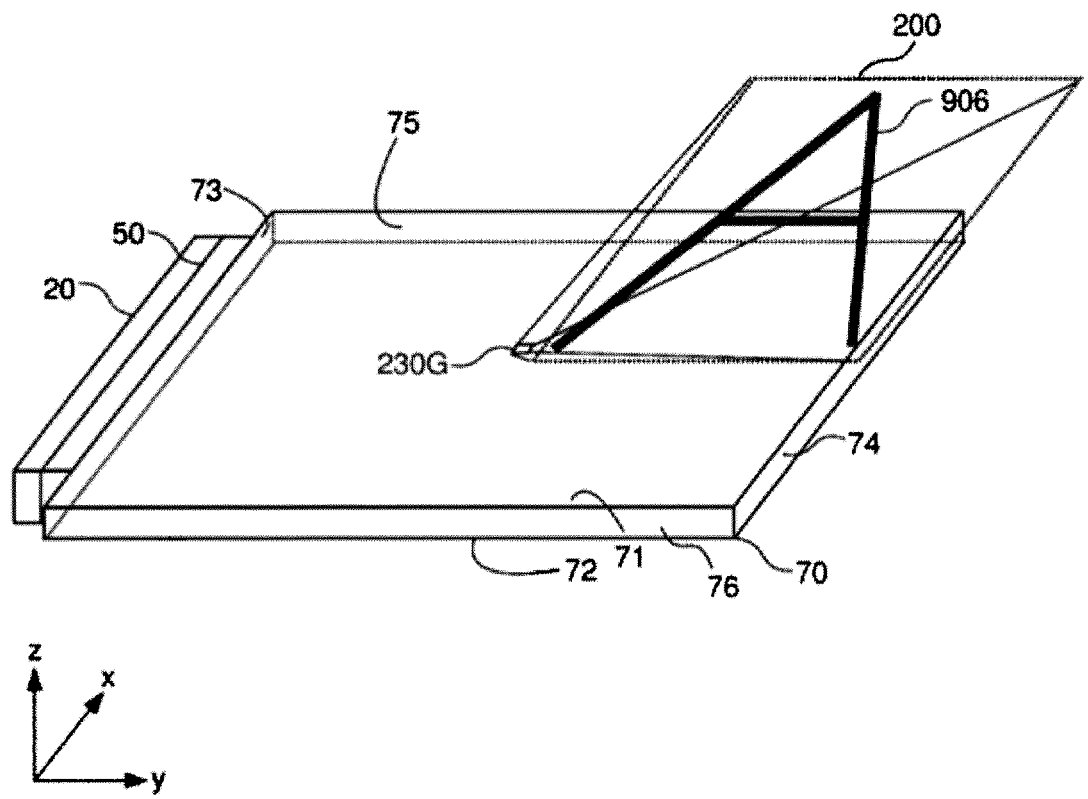
FIG. 16 is for describing how a deflector 230G is formed as a comparison with the deflector 230A.
Figure 17A:
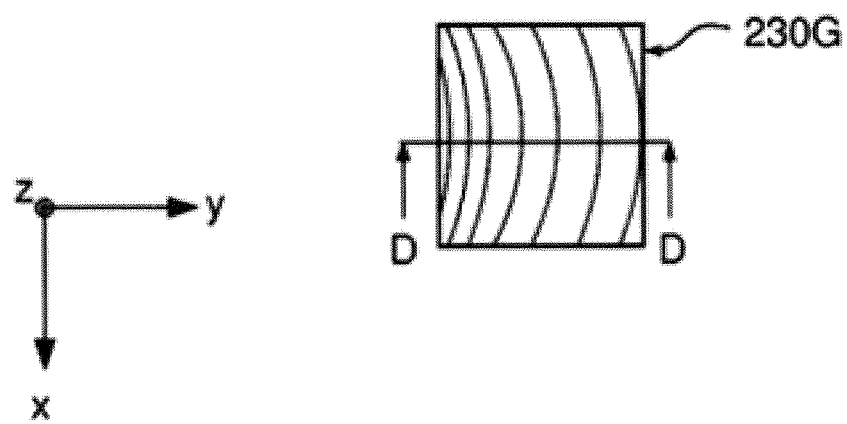
FIGS. 17A and 17B are for describing how a deflector 230G is formed as a comparison with the deflector 230A.
Figure 17B:

FIG. 16, FIG. 17A, and FIG. 17B are for describing how a deflector 230G is formed as a comparison with the deflector 230A. The deflector 230G may be provided as a portion of a Fresnel lens.

The optical surfaces forming the Fresnel lens are provided on the rear surface 72 of the light guide plate 70 for each deflector 230. FIG. 17A and FIG. 17B illustrate when a Fresnel lens is created for a single deflector 230G. The Fresnel lens portion in each of the deflectors 230G deflects light guided through the light guide plate 70 so that the light beams passing through the plane 9 which contain the image 906 exit from the emission surface 71.

Figure 18A:
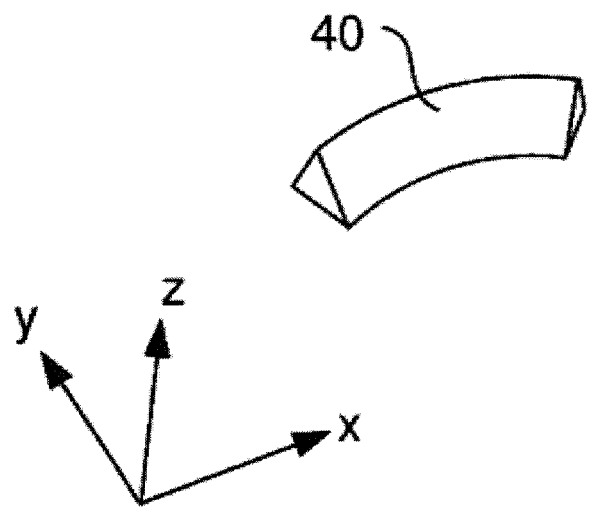
FIGS. 18A, 18B, and 18C schematically illustrate additional examples for the shape of an optical element 231.
Figure 18B:
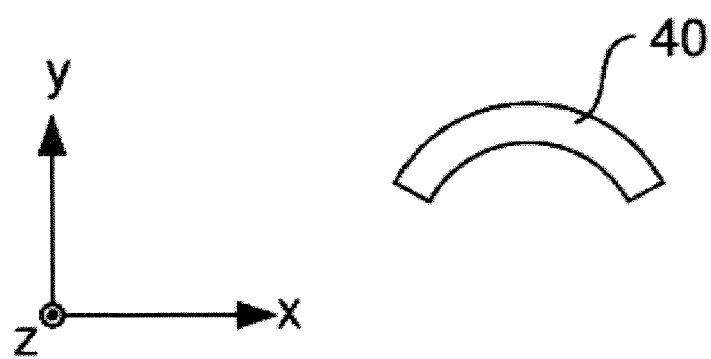
Figure 18C:
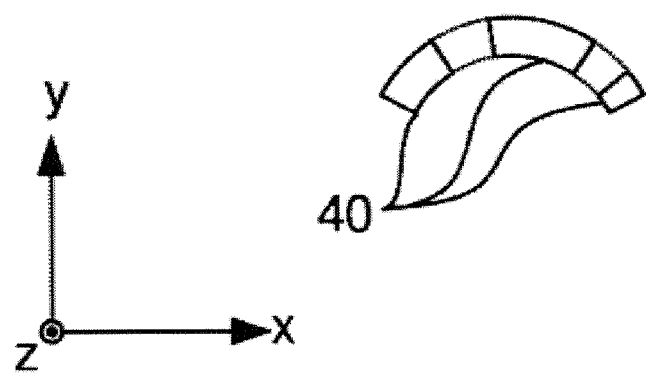

FIGS. 18A, 18B, and 18C schematically illustrate additional examples for the shape of an optical element 231; FIG. 18A is a perspective view of an optical element 231; and FIG. 18B illustrates when the reflection surface 40 is projected onto the xy plane. When the reflection surface 40 is projected onto the xy plane, the outer shape in the positive y axis direction and the outer shape toward the negative y axis direction which outline the reflection surface 40 are concentric arcs. The outer shape in the negative y axis direction of the reflection surface 40 projected onto the xy plane may be referred to as the front outline while the outer shape toward the positive y axis direction is referred to as the rear outline. The front outline and the rear outline of the reflection surface 40 form concentric arcs.

If cut along a plane parallel to the zy plane, the line of intersection between the optical element 231 illustrated in FIG. 18A and FIG. 18B and the reflection surface 40 is a straight line. However, because the front outline and the rear outline are curved, the reflection surface 40 in FIG. 18 is a curved surface. Therefore, a single reflection surface 40 can present the light needed to create a line or a plane forming at least a portion of the image.

FIG. 18C schematically illustrates additional examples for the shape of the reflection surface of an optical element 231. FIG. 18C illustrates the shape of a reflection surface 40 projected onto the xy plane. As can be seen in FIG. 18C the front outline and a rear outline forming the concentric arcs outlining the reflection surface 40 are partitioned to provide a reflection surface 40 separated into a plurality of sections.

Figure 19A:
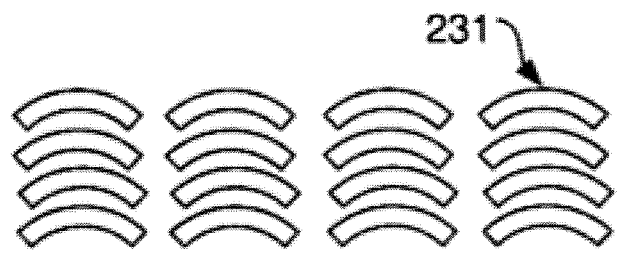
FIGS. 19A, 19B, and 19C schematically illustrate examples of distributing optical elements 231 in the xy plane.
Figure 19B:
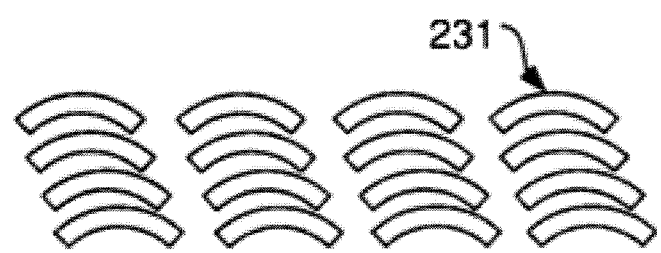
Figure 19C:
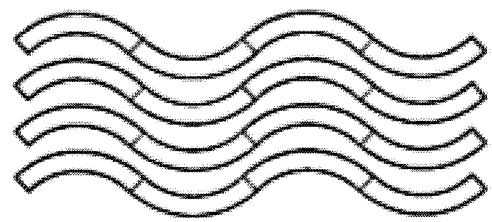

FIGS. 19A, 19B, and 19C schematically illustrate examples for distributing optical elements 231 in the xy plane. FIG. 19A illustrates an example where a plurality of optical elements 231 form a line along the y axis direction. FIG. 19B is a modified version of the example in FIG. 19A, and illustrates an example where the optical elements 231 are distributed so that when the optical elements 31 aligned along the y axis direction are viewed in order, the same are shifted along the x axis direction by a fixed offset. FIG. 19C illustrates an example where the optical elements 231 are distributed continuously as a single element along the x axis direction. In FIG. 19C the end portions of optical elements adjacent in the x axis direction are connected to provide a single optical element. The dashes in FIG. 19C corresponds to the end portions of adjacent optical elements in the x axis direction.

Figure 20A:
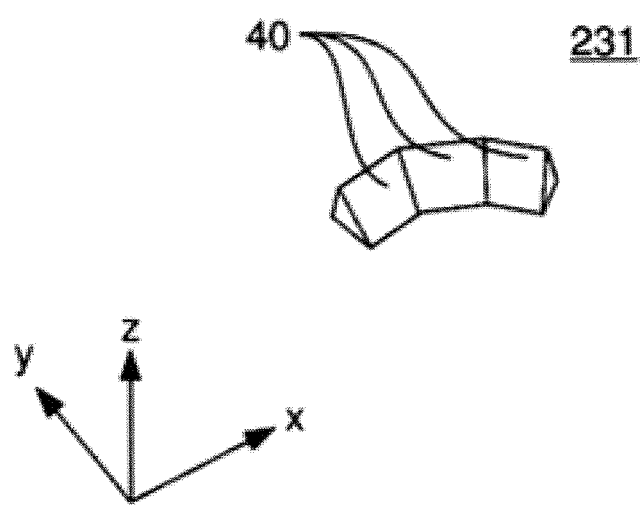
FIGS. 20A and 20B schematically illustrate various examples for the shape of the reflection surface of an optical element 231.
Figure 20B:
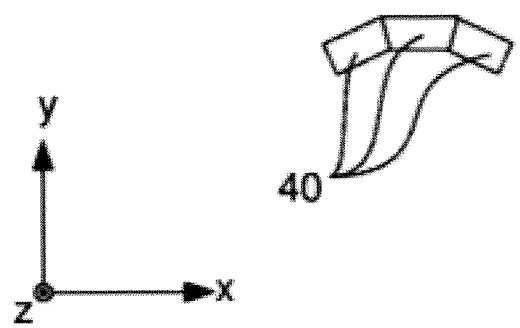

FIGS. 20A and 20B schematically illustrate additional examples for the shape of the reflection surface of an optical element 231. FIG. 20A is a perspective view of an optical element 231; and FIG. 20B illustrates when the reflection surface 40 is projected onto the xy plane. The optical element 231 is created from three planes with mutually different normal line directions. When the reflection surface 40 is projected onto the xy plane, each of the front outlines and the rear outlines form three polygonal lines that extend in different directions. Because the reflection surface 40 illustrated in FIG. 20 is flat, the light entering each of the reflection surfaces 40 is oriented in three mutually different directions. Therefore, the optical element 231 illustrated in FIGS. 20A and 20B can present light that creates three points which are a portion of the image.

Figure 21A:
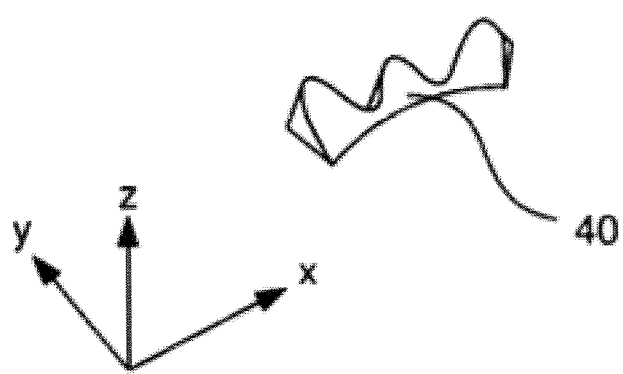
FIGS. 21A and 21B schematically illustrate various examples for the shape of the reflection surface of an optical element 231.
Figure 21B:
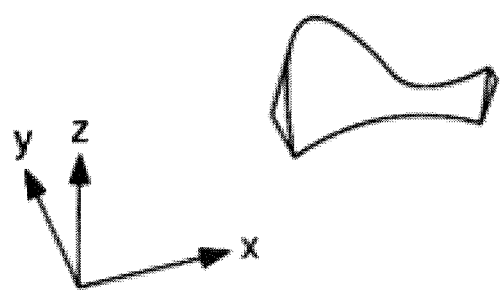

FIGS. 21A and 21B schematically illustrates additional examples for the shape of the reflection surface of an optical element 231. The reflection surfaces 40 in the optical element 231 illustrated in FIG. 21A and FIG. 21B differ from the optical element 231 illustrated in FIG. 18A; that is, the ridges of the reflection surface 40 toward the positive z axis have different heights in the z-axis direction. When projected onto the xz plane, the ridge of the reflection surface 40 toward the positive z axis changes continually along the x axis direction When cut along a plane parallel to the yz plane the linear length of the reflection surface 40 changes along the x axis direction. The intensity of light reflected from the reflection surface 40 therefore changes along the x axis direction. Consequently, the optical element 231 illustrated in FIG. 21A and FIG. 21B can present light for creating an image of lines where the luminance thereof changes along the x direction.

The display device 10 and the modifications thereto described with reference to FIG. 10 through FIG. 21 are configured such that each of the optical deflectors provided two dimensionally in a plane parallel to the emission surface of the light guide plate 70 supply light forming images at a plurality of locations in the three-dimensional image. Therefore, the three-dimensional image may be viewed over a wide range.

A stereo- or multi-view display device may be adopted instead of the above described display device 10, where the stereo- or multi-view display device uses a parallax image to provide a three-dimensional image artificially. For example, the light guide plate may include a deflector that deflects the light guided by the light guide plate, and causes the light creating a stereo- or multi-view parallax image to exit from the emission surface 71. To implement a stereo or multi-view display device using a light guide plate, the light guide plate may provide right-eye and left-eye parallax images by including a first group of reflection surfaces and a second group of reflection surfaces thereon that present a right-eye parallax image and a left-eye parallax image. A stereo or multi-view display device may be adopted without using the light guide plate. For example, a two-dimensional display device that presents a plurality of parallax images may function as a stereo or multi-view display device.

The above-described display device 10, and the stereo or multi-view display device are examples of a head-up display device that produce an image with a view of an object from above in a vertical direction in a space outside the display device for an image which presents an object with a vertical direction. A display body may, for example, deflect or convert light from the projected object into light that travels from where the image is formed in a direction the light is emitted thereby causing the light to form the image in an external space; such a display device may be adopted as the aforementioned head-up display device. The aforementioned head-up display device may use a two-dimensional image created by a projector or the like, or a two-dimensional image presented by a two-dimensional display device instead of a projected object.

The present invention is hereby described by way of the embodiments; however, the technical scope of the present invention is not limited to the above-described embodiments. It is obvious to a person skilled in the art that the above described embodiments can be modified or improved in various ways. The scope of the claims makes it clear whether such kinds of modifications or improvements to the embodiments is within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed any order as desired. The terms "first", "next", and the like are used for convenience when describing operational flows within the scope of the claims, the specification, and in the drawings, and does not mean that execution in this order is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A display device comprising:
a light guide plate that comprises an emission surface and a rear surface; and
a light source,
wherein light from the light source is totally reflected between the emission surface and the rear surface,
wherein the rear surface of the light guide plate comprises a plurality of deflectors,
wherein the display device is used for head-up display, and wherein the display device forms an image with a view of an object from above in a vertical direction in a space outside the display device for an image which presents an object with a vertical direction.

2. The display device according to claim 1,
wherein the object includes a reference surface that is a reference of the vertical direction, and
wherein the display device forms the image so that an observer has a view from the upper part of the reference surface.

3. The display device according to claim 2, wherein the display device forms the image with the object slanted to allow an observer a view from the upper part of the reference surface.

4. The display device according to claim 3, wherein the display device forms the image with an edge of the object toward an observation position in the reference surface lower in the vertical direction than an edge of the object opposite the observation position in the reference surface whereby the object is slanted to allow an observer a view from the upper part of the reference surface.

5. The display device according to claim 3, wherein the reference surface is substantially parallel to the horizontal plane of the object.

6. The display device according to claim 4, wherein the reference surface is substantially parallel to the horizontal plane of the object.

7. The display device according to claim 2, wherein the reference surface is substantially parallel to the horizontal plane of the object.

8. The display device according to claim 2,
wherein the display device is configured to provide route guidance,
wherein the object presents a route to guide an observer,
wherein the reference surface represents a path providing the route, and
wherein the display device forms the image that allows an observer a view from the upper part of the path.

9. The display device according to claim 8, wherein the image includes an image of an arrow presenting the direction along which an observer should travel on the path.

10. The display device according to claim 2,
wherein the object represents an input component that an observer may manipulate,
wherein the reference surface is the input surface of the input component, and
wherein the display device forms the image to allow an observer to see the input surface.

11. The display device according to claim 2, comprising:
a light guide plate configured to guide light within a plane parallel to an emission surface; and
a plurality of deflectors configured to deflect light guided thereto by the light guide plate, causing light forming the image in a space outside the light guide plate to exit from the emission surface,
wherein the plurality of deflectors form the image with a view of the object from above in the vertical direction in a space outside the light guide plate.

12. The display device according to claim 1,
wherein the light guide plate guides light within a plane parallel to the emission surface; and
wherein the plurality of deflectors deflect light guided thereto by the light guide plate, causing light forming the image in a space outside the light guide plate to exit from the emission surface,
wherein the plurality of deflectors form the image with a view of the object from above in the vertical direction in a space outside the light guide plate.

13. The display device according to claim 12,
wherein each deflector in the plurality of deflectors cause the light to exit from the emission surface toward a direction substantially converging onto a single convergence point or convergence line in the space, or to substantially radiate from a single convergence point or convergence line in the space, and
wherein the convergence point or the convergence line is mutually different among the plurality of deflectors with a grouping of a plurality of the convergence points or the convergence lines forming the image in the space.

14. The display device according to claim 13, wherein each deflector in the plurality of deflectors is formed along a predetermined line within a plane parallel to the emission surface.

15. The display device according to claim 12, wherein each deflector in the plurality of deflectors is configured to spread the light incident thereon into light with an intensity distribution corresponding to the image in a direction orthogonal to the light guide direction of the light guide plate in a plane parallel to the emission surface and cause the emission surface to output said light such that grouping the light from a plurality of the deflectors arranged along a direction orthogonal to the light guide direction thereby forms the light radiating from the image.

16. The display device according to claim 12, wherein each deflector in the plurality of deflectors is configured to spread the light incident thereon two-dimensionally into light with an intensity distribution corresponding to the image and cause the emission surface to output said light such that grouping the light from three or more deflectors arranged on different straight lines thereby forms the light radiating from the image.

17. The display device according to claim 15, wherein each deflector in the plurality of deflectors includes one or a plurality of groups of deflection surfaces inclined relative to the emission surface on the outer surface or on the inside of the light guide plate and configured to reflect, refract, or diffract light guided thereto by the light guide plate.

18. The display device according to claim 17, wherein at least one of the deflection surfaces includes a plurality of flat or curved surfaces oriented in different directions.

19. The display device according to claim 17, wherein at least one of the deflection surfaces is extended, bent, or curved in a direction orthogonal to the light guide direction of the light guide plate when the deflection surface is projected onto a surface parallel to the emission surface.

20. The display device according to claim 1, wherein the display device presents a parallax image for stereo view or multiple views.

* * * * *